United States Patent [19]
Koyabu et al.

[11] Patent Number: 6,026,333
[45] Date of Patent: Feb. 15, 2000

[54] DATA UTILIZING SYSTEM

[75] Inventors: Masaharu Koyabu; Hajime Shimizu; Koji Wakio; Hideki Okamoto; Ichiro Watanabe, all of Kawasaki, Japan

[73] Assignee: Fujitsu Limited, Kawasaki, Japan

[21] Appl. No.: 08/996,170

[22] Filed: Dec. 22, 1997

[30] Foreign Application Priority Data

Jun. 10, 1997 [JP] Japan ................................. 9-152531

[51] Int. Cl.[7] ................................................ G05B 11/01
[52] U.S. Cl. ............................................ 700/16; 710/200
[58] Field of Search ................................. 364/145, 900; 395/709, 726, 608, 770, 700; 250/563; 700/16; 710/200

[56] References Cited

U.S. PATENT DOCUMENTS

| | | | |
|---|---|---|---|
| 4,221,974 | 9/1980 | Mueller et al. | 250/563 |
| 4,604,711 | 8/1986 | Benn et al. | 364/900 |
| 4,975,828 | 12/1990 | Wishneusky et al. | 364/200 |
| 5,615,373 | 3/1997 | Ho | 395/726 |
| 5,696,973 | 12/1997 | Agrawal et al. | 395/709 |
| 5,799,307 | 8/1998 | Buitron | 707/100 |

FOREIGN PATENT DOCUMENTS

8-180072  7/1996  Japan .

Primary Examiner—William Grant
Assistant Examiner—Victoria Robinson
Attorney, Agent, or Firm—Staas & Halsey, LLP

[57] ABSTRACT

A data utilizing system comprises a data processor, a database for holding plural pieces of data made corresponding to a date and a time as a record, and a category definition dictionary for holding the category definition data about the plural pieces of data, corresponding to periods. When an indication to categorize the records held in the database is inputted to the data processor, the data processor reads the relevant category definition data from the category definition dictionary, and fundamental data forming each record in the database are classified per given period into predetermined categories and tabulated.

6 Claims, 10 Drawing Sheets

| TRANSACTION NUMBER | NAME OF PRODUCT | SALES VOLUME | SALES DATE | CUSTOMER | SALES SHOP | NUMBER OF SOLD PRODUCTS |
|---|---|---|---|---|---|---|
| 001 | PERSONAL COMPUTER FMV433 | 100,000 YEN | 1992/4/1 | A | | |
| 002 | | | | | | |
| | | | | | | |

```
SET-000 [SELECTION OF DATA]

DATA LIST:
  ┌ ITEMS(1) ─────────┐    ┌──────────────────┐
  │ ┌──────────────┐  │    │ CATEGORY         │
  │ │NAME OF PRODUCT(2)│ │    │ DEFINITION (3)   │
  │ └──────────────┘  │    └──────────────────┘
  │  CUSTOMER         │    ┌──────────────────┐
  │  SALES SHOP       │    │                  │
  │  SALES DATE       │    │                  │
  └───────────────────┘    └──────────────────┘
```

(b)

```
SET-000 [INPUT OF CATEGORY DEFINITION]

APPLICABLE    ┌────────┐   ┌────────┐
PERIOD (1)    │1992/4/1│ ~ │1993/3/31│
              └────────┘   └────────┘

┌ CATEGORIZATION ──┐    ┌ FUNDAMENTAL DATA (2) ┐
 │  RULE (3)        │    │ FMV466S              │
 │ BEGINNER'S MACHINE│    │ FMV4100              │
 │   ├ FMV433       │    │                      │
 │   └ FMV450       │    │                      │
 │ INTERMEDIATE MACHINE│ │                      │
 │   ├ FMV450S      │    │                      │
 │   └ FMV466       │    │                      │
 │ HIGH GRADE MACHINE│   │                      │
 │   └ FMV466DX     │    │                      │
 └──────────────────┘    └──────────────────────┘

┌───────────┐   ┌──────────┐
 │COMPLETION │   │ NEXT     │
 │           │   │ PERIOD(4)│
 └───────────┘   └──────────┘
```

FIG. 7

| APPLICABLE PERIOD | CATEGORY | FUNDAMENTAL DATA (NAME OF PRODUCT) | |
|---|---|---|---|
| FIRST PERIOD (1992/4/1- 1993/3/31) | BEGINNER'S MACHINE | HO(FMV433) | |
| | | HI(FMV450) | |
| | INTERMEDIATE MACHINE | GO(FMV450S) | |
| | | GI(FMV466) | |
| | HIGH GRADE MACHINE | FO(FMV466DX) | |
| SECOND PERIOD ( ) | | | |
| THIRD PERIOD ( ) | | | |

```
EUC-000 [SELECTION OF DATA AND CATEGORY DEFINITION]
┌CATEGORY DEFINITION(3)──────┐  ┌DATA(4)──────────────┐
│ ┌─────────────────────────┐│  │┌───────────────────┐│
│ │ PRODUCT LINE-UP (5)     ││  ││ SALES VOLUME (6)  ││
│ └─────────────────────────┘│  │└───────────────────┘│
│   CUSTOMER                 │  │  NUMBER OF SOLD     │
│   SALES SHOP               │  │  PRODUCTS           │
└────────────────────────────┘  └─────────────────────┘
 ┌────┐
 │ OK │
 └────┘
```

| RESULT OF CATEGORIZATION AND TABULATION | SALES VOLUME |
|---|---|
| BEGINNER'S MACHINE | X = 1,000,000 YEN |
| INTERMEDIATE MACHINE | Y = 2,000,000 YEN |
| HIGH GRADE MACHINE | Z = 1,000,000 YEN |

(b)

| DETAILED CONTENT OF RESULT OF CATEGORIZATION AND TABULATION | FIRST PERIOD 1992/4/1~1993/3/31 | SECOND PERIOD | THIRD PERIOD | REMARKS |
|---|---|---|---|---|
| | | H0: OF SALE / H1: OF SALE | H0: DISCONTINUE OF SALE / G1: DISCONTINUE OF SALE | |
| BEGINNER'S MACHINE | H0, H1 | H0, G1 | G0, F0 | SUM X OF FIRST PERIOD: H0, H1 SECOND PERIOD: H0, G1 THIRD PERIOD: F0, G0 |
| INTERMEDIATE MACHINE | G0, G1 | G0, F0 | F1 | SUM Y OF FIRST PERIOD: G0, G1 SECOND PERIOD: F0, G0 THIRD PERIOD: F1 |
| HIGH GRADE MACHINE | F0 | F1 | | SUM Z OF FIRST PERIOD: F0 SECOND PERIOD: F1 THIRD PERIOD: NOTHING |

DATA UTILIZING SYSTEM

BACKGROUND OF THE INVENTION

The present invention relates to a data utilizing system.

In the great majority of cases, data (e.g., transaction data of a record of a day-to-day transaction) based on the premise of being utilized by a computer have hitherto been accumulated as table format data (table data) in which the data (record) having a fixed structure corresponding to one event are recorded by the number of events. Then, the record consists of plural pieces of data expressing one event that are stored in a state of being arranged in a certain number of sectioned record areas (fields).

On the occasion of utilizing the data accumulated as the table data, there are executed a process of categorizing a plurality of records according to predetermined categorization rules on the basis of stored values in specified fields in the plurality of records, a tabulating process per aggregation (category) of the categorized records, and a process of obtaining a tendency and a difference between categories.

Incidentally, there must be a case in which the data to be utilized have been accumulated over a long period of time, and a variety of generations ranging from an old record up to a new record might exist in the table data. In the case of categorizing such a plurality of records in the data table, if the categorization rules are uniformized throughout all the generations, it happened that the data accumulated as the table data could not be categorized and tabulated as a user intended.

For example, it might happen that an electronic apparatus such as a personal computer, etc. was classified as a high grade product at the beginning of sales in the market, then several month later classified as a intermediate product, and another several months later classified as a wide-spread product. If the data table relative to such an electronic apparatus is categorized without considering the generations of the respective records, there must be a case wherein the record that should be categorized as a wide-spread product is to be categorized as a high grade product, or the record that should be categorized as an intermediate product is to be categorized as a high grade product, and the categorized result thus becomes different from the intention of the user.

As described above, if the utilization target data accumulated in the data table has some elements enough to differentiate the category with a passage of time, it is required that the records be categorized and tabulated per generation of the data.

SUMMARY OF THE INVENTION

It is a primary object of the present invention, which was contrived in views of the above problems, to provide a data utilizing system capable of simply actualizing categorization and tabulation according to generation meeting with a purpose of a user without creating a hitherto-existing program for intricate categorization.

To accomplish the above object, the present invention adopts the following constructions.

According to a first aspect of the present invention, a data utilizing system comprises a data holding unit for holding plural pieces of data made to correspond to time, a category definition data holding unit for holding plural pieces of category definition data defining a categorization rule about the plural pieces of data, each of the pieces of category definition data related to any one of applicable periods, and a categorizing unit for categorizing, per applicable period, plural pieces of data corresponding to time within the applicable period held by the data holding unit, in accordance with the category definition data related to said applicable period held by the category definition data holding unit.

According to the first aspect of the present invention, the data utilizing system may further comprise a tabulating unit for tabulating, per set of data categorized by the categorizing unit, a numerical element of data included the set of data.

According to the first aspect of the present invention, the data utilizing system may be constructed so that the data holding unit holds each of the plural pieces of data as a record consisting of data about a plurality of items, and each of the category definition data contains a categorization rule about at least one of the items in the record.

The items given above include, e.g., a name of product, a customer and a sales shop etc.

According to a second aspect of the present invention, a data utilizing method comprises a first step of holding plural pieces of data made to correspond to time, a second step of holding plural pieces of category definition data defining a categorization rule about the plural pieces of data, each of the pieces of category definition data related to any one of applicable periods, and a third step of categorizing, per applicable period, plural pieces of data corresponding to time within the applicable period held by the first step, in accordance with the category definition data related to the applicable period held by the second step.

According to a third aspect of the present invention, a computer readable medium is recorded with a computer program comprising a first step of holding plural pieces of data made to correspond to time, a second step of holding plural pieces of category definition data defining a categorization rule about the plural pieces of data, each of the pieces of category definition data related to any one of applicable periods, and a third step of categorizing, per applicable period, plural pieces of data corresponding to time within the applicable period held by the first step, in accordance with the category definition data related to the applicable period held by the second step.

According to the present invention, the category definition data according to the generation is created, the relevant category definition data is referred to when categorizing the accumulated records, and there is executed the categorizing/tabulating process to which the categorization rule differing according to the generation is applied. Therefore, it is feasible to easily implement the categorization and tabulation according t the generation meeting with the application purpose without creating the program for the complicated categorization as done in the prior art. According to the present invention, the data can be categorized taking a generation time of the data into consideration, and hence it is feasible to grasp, e.g., a trend of commercial goods more accurately.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENT

A preferred embodiment of the present invention will hereinafter be described with reference to the accompanying drawings.

[Construction of Data Utilizing System]

Figure 1:
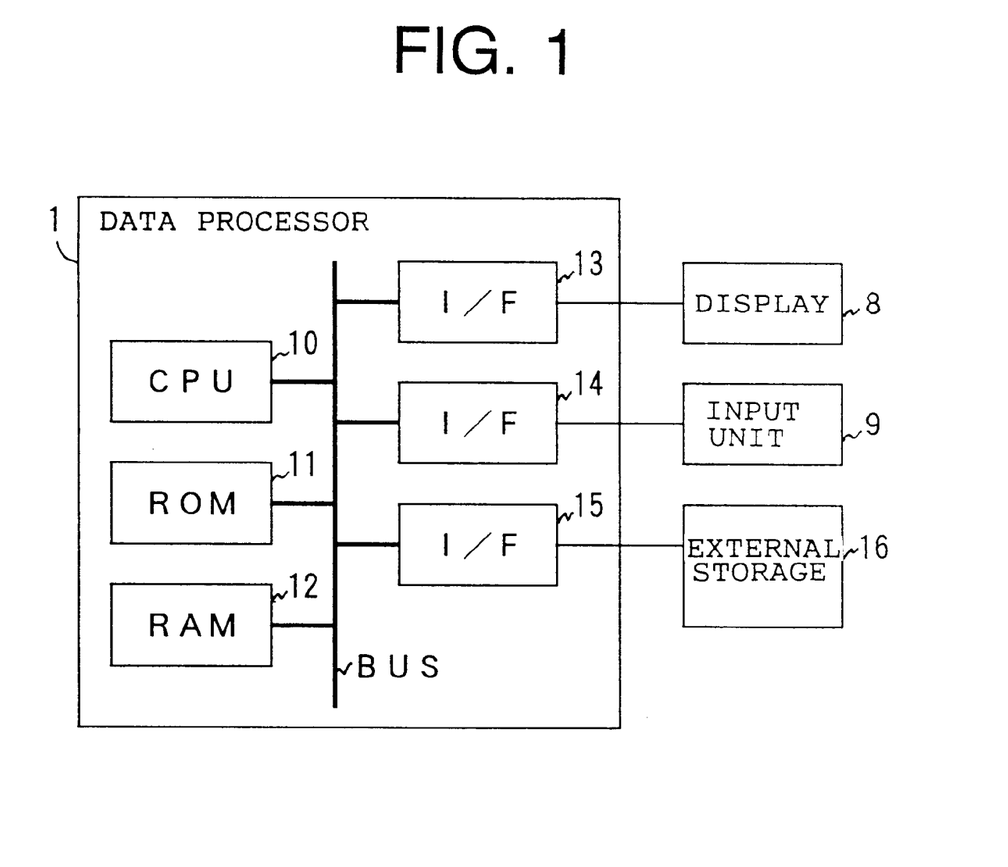
FIG. 1 is a diagram showing a construction of a data utilizing system in accordance with an embodiment of the present invention.

FIG. 1 is a diagram showing a data utilizing system in accordance with the embodiment of the present invention. Referring to FIG. 1, the data utilizing system is constructed of a data processor 1, a display 8 connected to the data processor 1, an input unit 9 and an external storage 16.

The data processor 1 is a computer such as, e.g., a personal computer and a workstation etc for executing a variety of processes to data. The data processor 1 includes a CPU (Central Processing Unit) 10, a ROM (Read Only Memory) 11, a RAM (Random Access memory) 12 and interfaces (I/F) 13–15, which are connected to each other via a bus. Then, the display 8 is connected to the interface I/F 13, the input unit 9 is connected to the interface I/F 14, and the external storage 16 is connected to the interface I/F 15.

Herein, the ROM 11 is stored with a variety of programs executed by the CPU 10 and with various items of data used when executing the programs. The RAM 12 is utilized as a working area for the CPU 10 and is stored with results of executions of the programs by the CPU 10. The CPU 10 implements processes for the display 8, the input unit 9 and the external storage 16 as well as for the ROM 11, the RAM 12 and the interfaces I/F 13–I/F 15 by loading the programs stored in the ROM 11 into the RAM 12 and then executing these programs.

The display 8 is constructed by using a CRT (Cathode Ray Tube) and an LCD (Liquid Crystal display) etc, and displays images and characters etc based on a processed result of the CPU 10 in accordance with an indication given from the CPU 10.

The input unit 9 is constructed by use of a keyboard and pointing devices such as a mouse, a trackball, a joystick etc. The input unit 9 is used for an operator of the data processor 1 to input data.

The external storage 16 comprises a large-capacity storage device such as a hard disk, a magneto-optic disk and a magnetic tape etc, and a processing device for performing write/read operations to and from these storage devices. The external storage 16 is stored with a database and a dictionary file etc.

[Function of Data Utilizing System]

Figure 2:
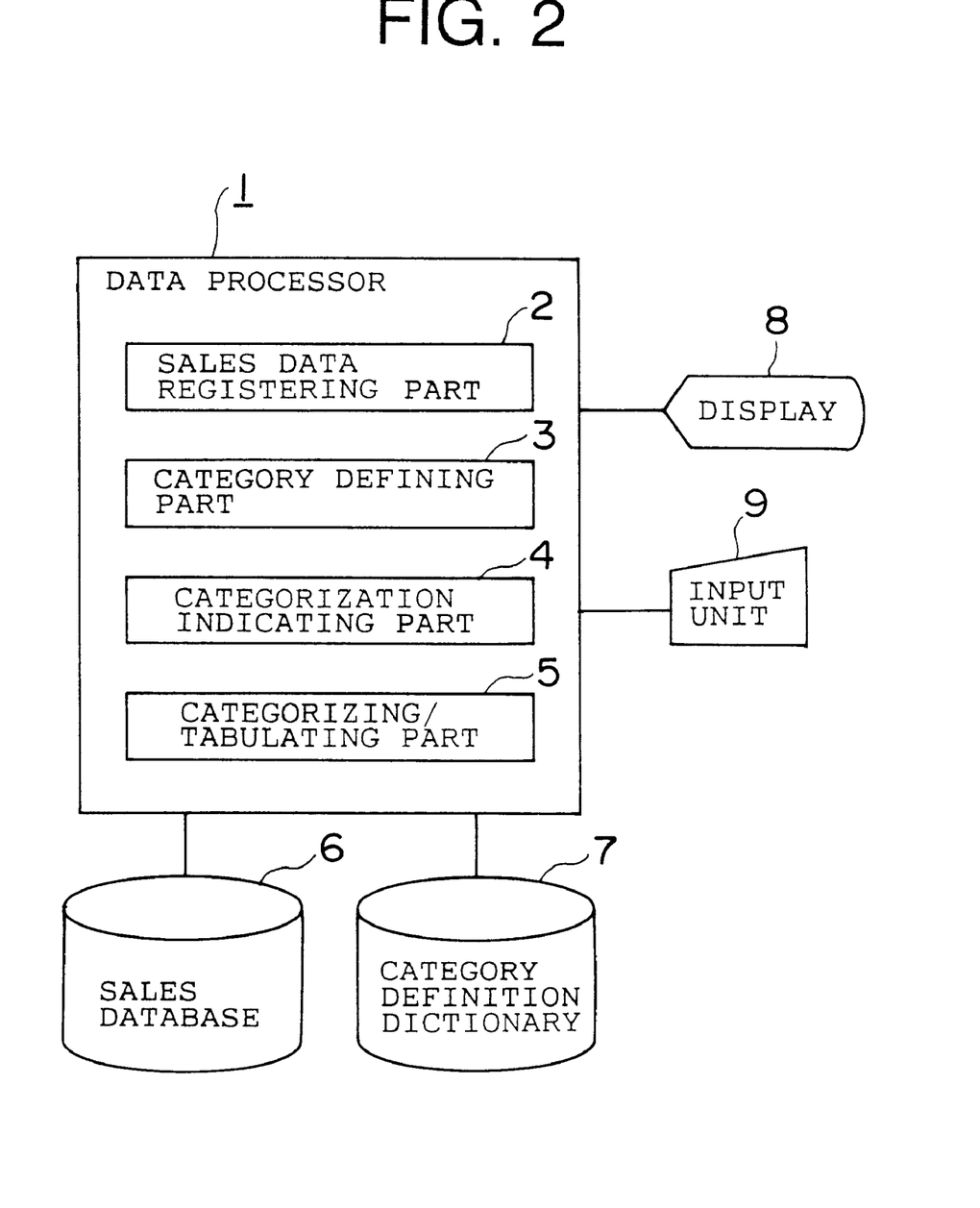
FIG. 2 is a functional block diagram of the data utilizing system shown in FIG. 1.

FIG. 2 is a functional block diagram of the data utilizing system illustrated in FIG. 1. As shown in FIG. 2, the CPU 10 executes the programs stored in the ROM 11, whereby the data processor 1 functions as an apparatus for actualizing a sales data registering part (hereinafter referred to as a "registering part") 2, a category defining part 3, a categorization indicating part 4 and a categorizing/tabulating part 5. Further, a sales database (hereinafter termed a "database") 6 and a classification defining dictionary 7, which are shown in FIG. 2, are loaded into the external storage 16 shown in FIG. 1.

Figure 4:
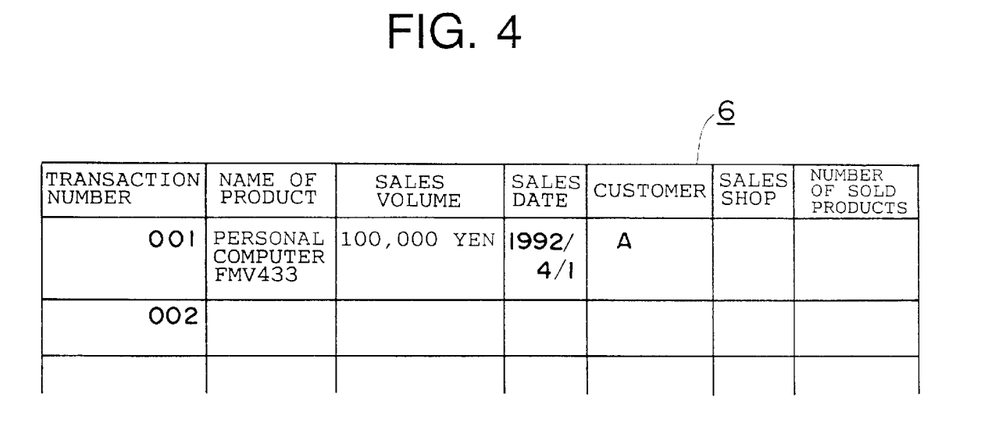
FIG. 4 is a table showing an example of a sales database shown in FIG. 2.

Herein, the registering part 2 generates a record in which the sales data inputted from the input unit 9 are arranged corresponding to a date and a time, and register (accumulates) the record in the database 6. At this time, the registering part 2, for example, as shown in FIG. 4, generates a record per product sold and registers the record in the database 6.

Figure 7:
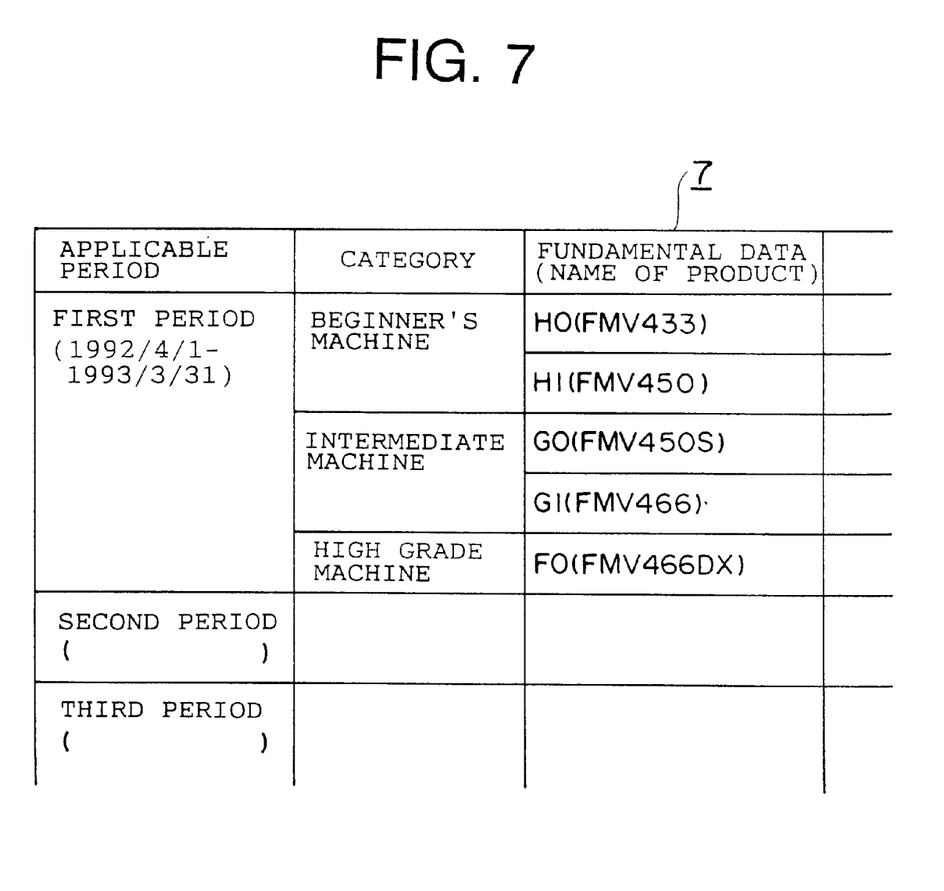
FIG. 7 is a table showing an example of a category definition dictionary shown in FIG. 2.

The category defining part 3 registers, in the category definition dictionary 7, category definition data in which categories of a plurality of records registered in the database 6 are defined. For instance, as shown in FIG. 7, the category defining part 3 generates, for every applicable period of a categorization rule (a rule for deciding where fundamental data belongs to categories), the category definition data contained in the categorization rule corresponding to a application purpose such as a product line-up etc of the database 6. The category defining part 3 then registers each item of generated category definition data in the category definition dictionary 7.

The categorization indicating part 4 indicates the categorizing/tabulating part 5 to categorize the records registered in the database 6. At this time, the categorization indicating part 4 designates, for the categorizing/tabulating part 5, the category definition data that should be used by the categorizing/tabulating part 5 out of plural of category definition data registered in the category definition dictionary 7.

The categorizing/tabulating part 5 executes a process of categorizing the records registered in the database 6 in accordance with the designated category definition data in response to the indication given from the categorization indicating part 4, and tabulates results thereof.

The database 6 is registered with a plurality of sales data (accumulated therein) about products in the form of a plurality of records. Further, the category definition dictionary 7 is registered with plural items of category definition data defined according to application purposes (e.g., the product line-up etc) of the database 6. Herein, as in an example shown in FIG. 7, the category definition data of the product line-up is registered.

[Process by Data Utilizing System]

Figure 3:
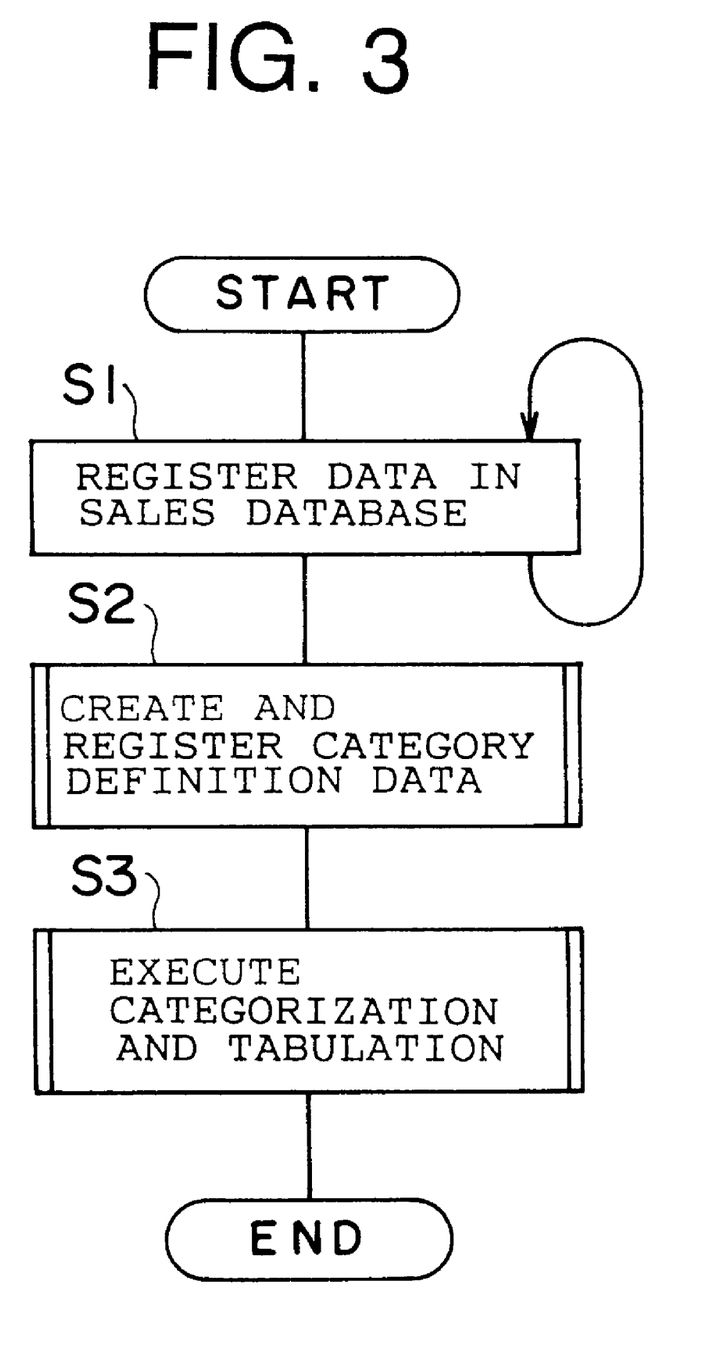
FIG. 3 is a flowchart showing processes in the data utilizing system shown in FIG. 1.

FIG. 3 is a flowchart showing processes (operations) by the data utilizing system illustrated in FIG. 2.

Referring to FIG. 3, upon a start of the processing, the registering part 2 registers in the database 6 the product sales data inputted from the input unit 9 (S1). At this time, the registering part 2 registers the sales data in the database 6 in a state where various items of data of, e.g., a transaction number, a name of product, a sales volume, a sales date and a customer etc are stored in respective fields of the record per sold product (see FIG. 4). Note that the process in step Si is repeatedly executed every time the sales data are inputted from the input unit 9.

Figure 8:
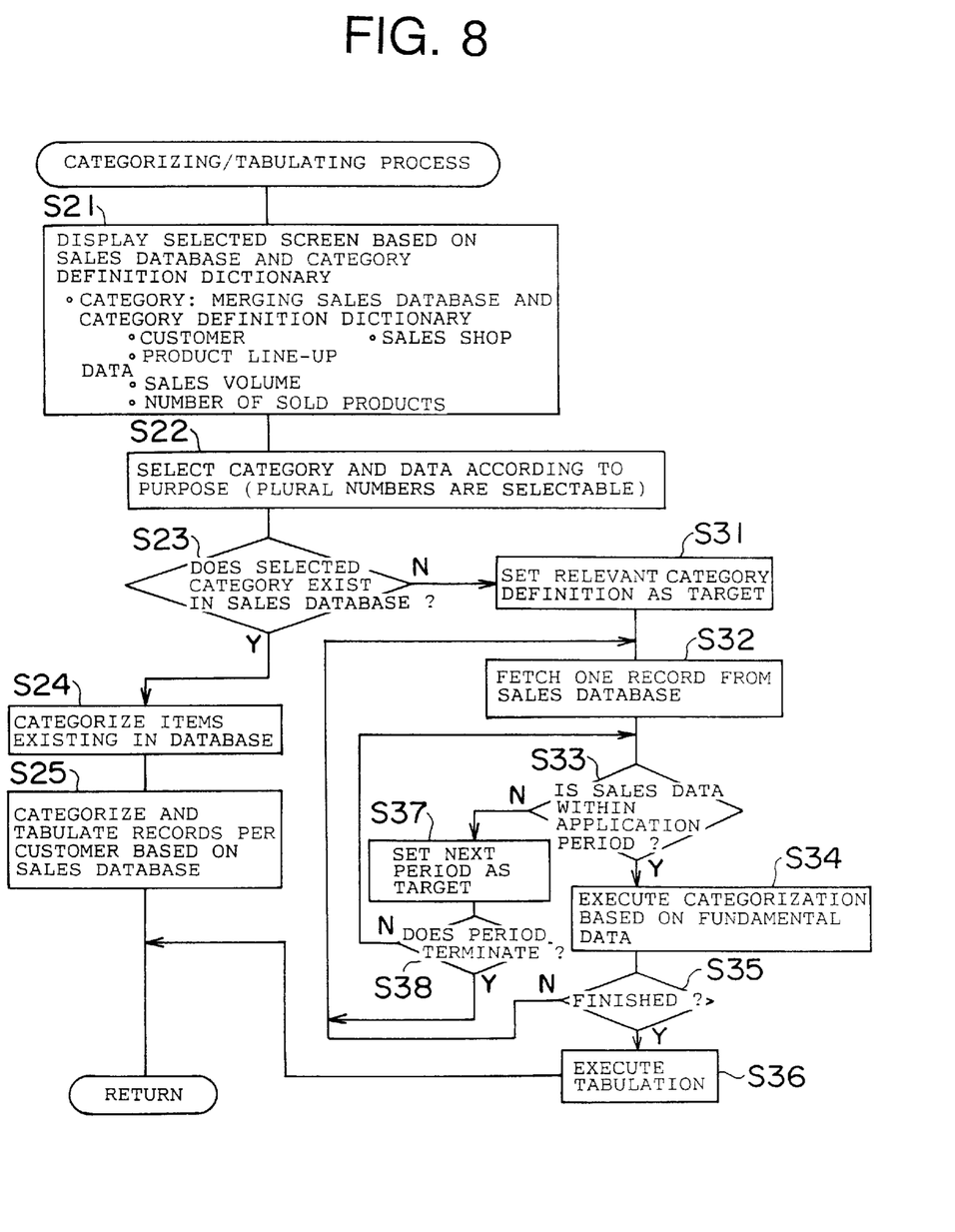
FIG. 8 is a flowchart showing a categorizing/tabulating process by the data utilizing system shown in FIG. 2.

Next, the category defining part 3 implements a process of creating and registering the category definition data. To be specific, the category defining part 3 creates category definition data about a plurality of records in the database 6 on the basis of the data inputted from the input unit 9, and registers the category definition data in the category definition dictionary 7 (S2). At this time, the category defining part 3, for example, as shown in FIG. 8, creates the category definition data in which a applicable period of categorizaiton rule, a category and a fundamental data (which is herein a name of product) are arranged corresponding to the application purpose (which is herein the product line-up) of the database 6, and registers the thus created category definition data in the category definition dictionary 7.

Thereafter, upon inputting the indication of categorizing the records from the input unit 9, the categorization indicating part 4 indicates the categorizing/tabulating part 5 to categorize the records. Thereupon, the categorizing/tabulating part 5 executes a process of categorizing and tabulating the plurality of records in the database 6 (S3). At this time, the categorizing/tabulating part 5 reads out the category definition data relevant to the categorizing indication out of the category definition dictionary 7. The categorizing/tabulating part 5 then categorizes the plurality of records in the database 6 in accordance with the categorization rule contained in the relevant category definition data, and tabulates the number of records according to each of the classified categories.

Thus, in the processes in steps Si and S2, the records showing the plural items of sales data are accumulated in the database 6, and the category definition data corresponding to the application purpose of the database 6 is registered in the category definition dictionary 7. Thereafter, in the process in step S3, the category definition data coincident with the application purpose of the database 6 is read out of the category definition dictionary 7, and the plurality of records are categorized and tabulated according to the categorization rule contained in the relevant category definition data. The records coincident with the application purpose of the database 6 can be thereby categorized and tabulated.

The data utilizing system in the present embodiment will hereinafter be described in greater detail with reference to FIGS. 4–10.

FIG. 4 is a table showing an example of the database 6 shown in FIG. 2. As shown in FIG. 4, the database 6 consists of a plurality of records in which the data on the sold product are stored together with the transaction number. The data stored in each record are exemplified and itemized as follows.

Transaction Number: 001
Name of Product: Personal Computer FMV433
Sales Volume: 10,000 Yen
Sales Date: 1992/4/1
Customer: A
Sales Shop:
Number of Sold Products:

As described above, pieces of data corresponding to the respective items of the transaction number, the name of product, the sales volume, the customer, the sales shop and the number of sold products are stored corresponding to the sales date in one record. Such records are accumulated in the database 6. It is therefore feasible to categorize and tabulate the records per generation by utilizing the categorization rule coincident with the application purpose of the database 6. Accordingly, a user of the database 6 can take the results of the categorizing and tabulating processes in such a form that the user is able to easily analyze trends in the market and in commercial goods.

Figure 5:
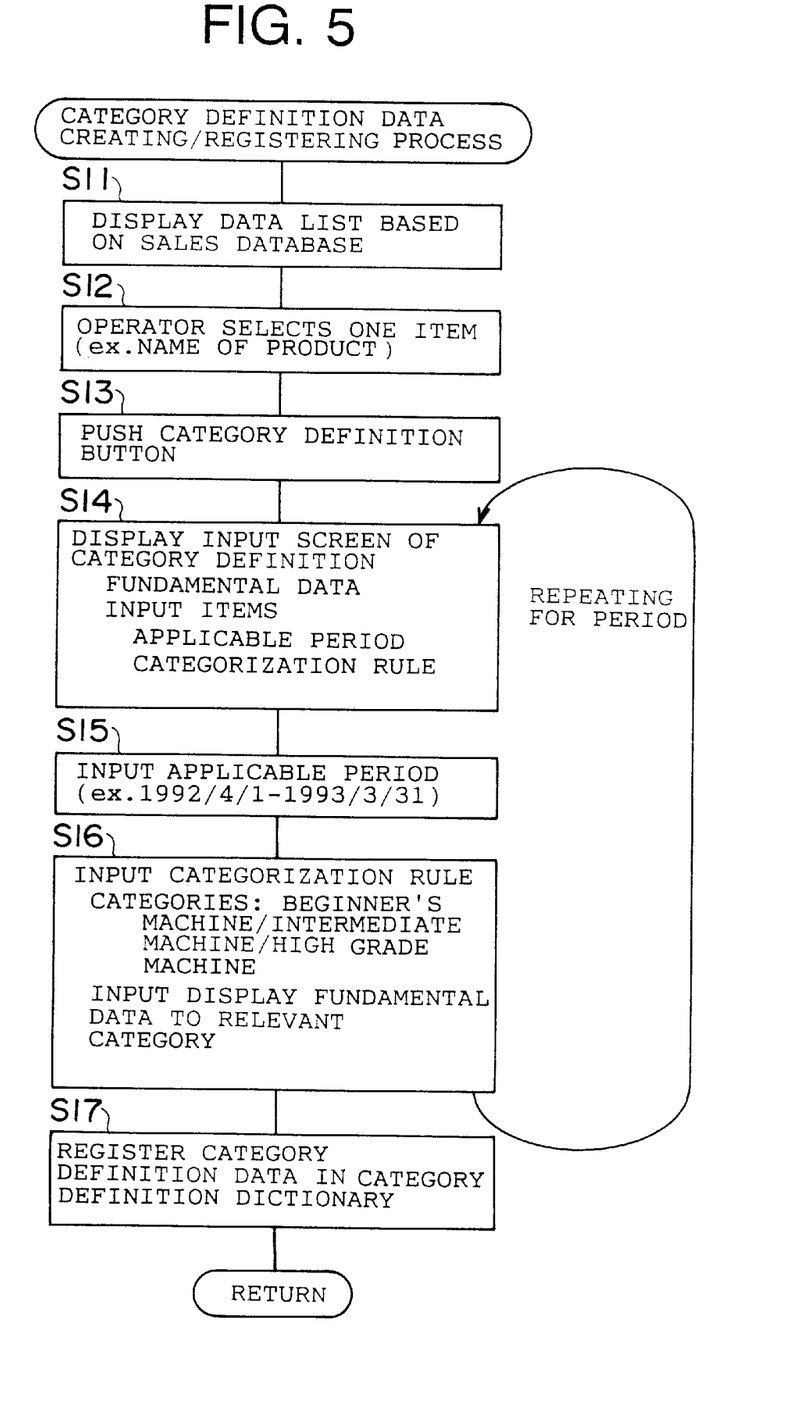
FIG. 5 is a flowchart showing a category definition data creating/registering process by the data utilizing system shown in FIG. 2.

FIG. 5 is a flowchart showing a category definition data creating/registering process (a subroutine in step S2 shown in FIG. 3) by the category defining part 3 shown in FIG. 2. Referring to FIG. 5, to start with, the category defining part 3 displays a data list based on a content of the accumulation of the database 6 (S11). That is, the category defining part 3 has the data list shown in, e.g., FIG. 6(a) displayed on the display 8 on the basis of the database 6 illustrated in FIG. 3. At this time, the data list displayed on the display 8 is itemized as follows:

Name of Product
Customer
Sales Shop
Sales Date

Figure 6:
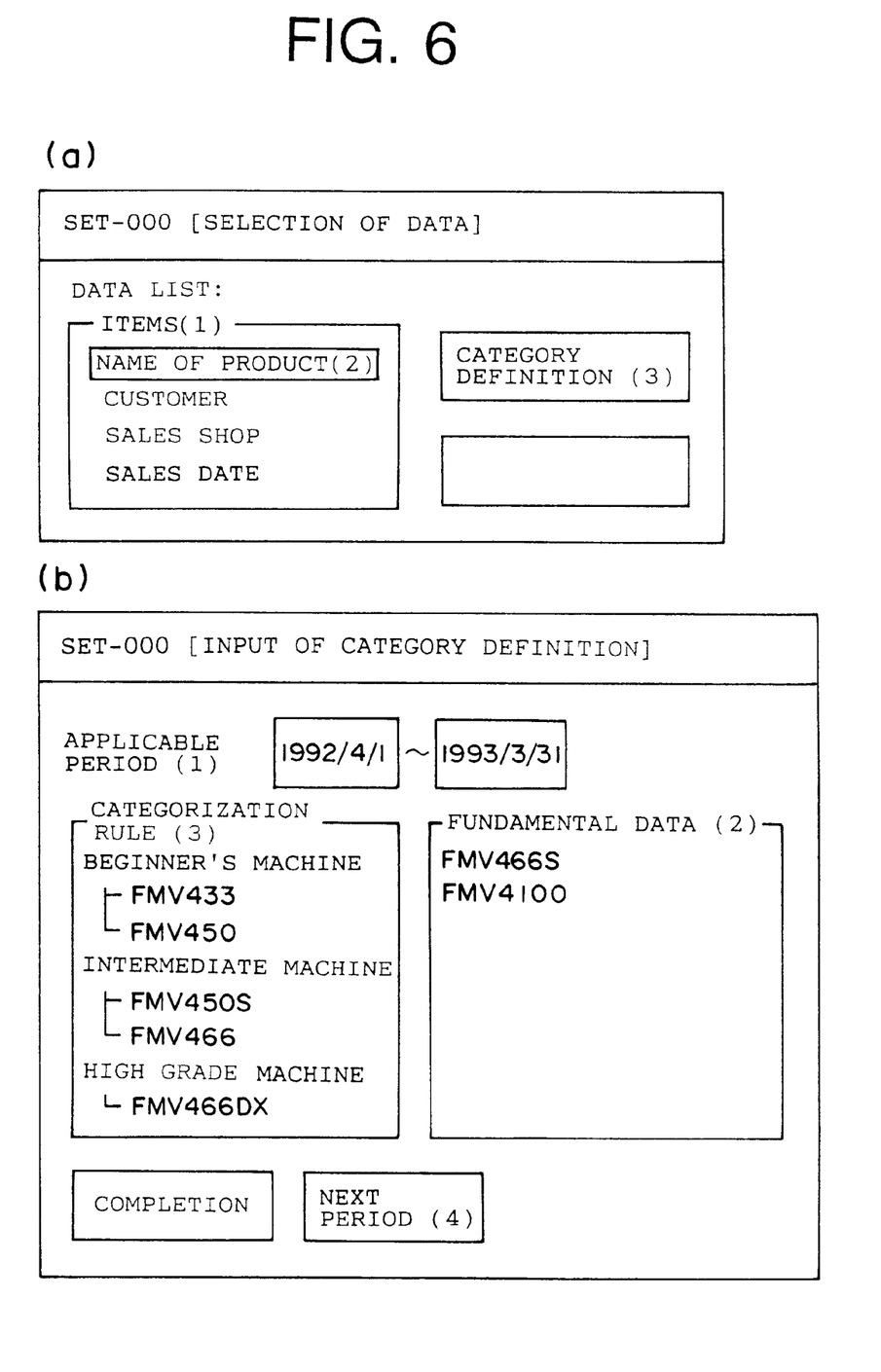
FIG. 6 is a table showing an example of a screen display in the category definition data creating/registering process shown in FIG. 5.

Next, the category defining part 3 prompts the operator of the data utilizing system to select any one of the items displayed in the screen shown in FIG. 6(a) (S12). It is herein assumed that the operator inputs a purport that the item "Name of Product" be selected by way of an example from the input unit 9. Subsequently, the category defining part 3 prompts the operator to push a category definition button B1 shown in FIG. 6(a) (S13).

In response thereto, when the operator pushes the category definition button B1 by use of the input unit 9, the category defining part 3 indicates the display 8 to display the input screen of the category definition data (see FIG. 6(b)). At this time, a screen for inputting the following items is displayed as the input screen on the display 8.

---

Fundamental Data:
Input Item:
    Applicable Period:
    Categorization rule:

---

Next, the category defining part 3 prompts the operator to input an applicable period (S15). Herein, it is assumed that the operator inputs, e.g., "1992/4/1–1993/3/31" as an applicable period from the input unit 9. Thereupon, the category defining part 3 prompts the operator to input the categorization rule (S16). It is herein presumed that the operator inputs the following categorization rule from the input unit 9.

Category: Beginner's Machine/Intermediate Machine/High grade Machine
Display fundamental data is inputted to the relevant category.

Finally, the category defining part 3 registers, in the category definition dictionary 7 shown in FIG. 7, a content (the applicable period, the categorization rule) as the category definition data inputted based on the input screen shown in FIG. 6(b) (S17). Then, the category definition data creating/registering process by the category defining part 3 is thus finished.

The category definition data about the product line-up as shown in FIG. 7 is created based on the database 6 shown in FIG. 4, and registered in the category definition dictionary 7. Further, the category definition data is created for every application purpose (e.g., the product line-up) of the database 6 (S14–S16). The category definition data, corresponding to the application purpose, of, e.g., the customer, the sales shop or the sales date etc are created. Then, each item of category definition data is registered in the category definition dictionary 7 (S17).

FIG. 6 is a diagram showing an example of the screen display in the case of the above-described category definition data creating/registering process. FIG. 6(a) shows the example of the screen display of the data list displayed in the process in step S11. The data list (items) is indicated by (1) in FIG. 6(a). This data list is a list in which the items (the name of product, the customer, the sales shop and the sales date etc) are displayed based on the database 6, and is served to create and register the category definition data per item in the category definition dictionary 7 by the user. The numeral (2) in FIG. 6(*a*) shows a state where the name of product is selected in the process in step S12. The numeral (3) in FIG. 6(*a*) indicates a state where the category definition button B1 is depressed in the process in step S13.

FIG. 6(*b*) shows a display example of a category definition data input screen displayed in the process in step S14. The applicable period, the categorization rule and the fundamental data etc are displayed on this input screen. The numeral (1) in FIG. 6(*b*) is an applicable period display area where the applicable period of the categorization rule inputted in the process in step S15 is displayed. Displayed in FIG. 6(*b*) is an applicable period "1992/41/1–1993/3/31" inputted in the process in step S15.

The numeral (2) in FIG. 6(*b*) represents the fundamental data relevant to the one within the applicable period among pieces of fundamental data corresponding to the "Name of Product" selected in the process in step S12. This piece of fundamental data is inputted any one of the categorization rules displayed on the input screen, whereby the categorization rule is defined.

The numeral (3) in FIG. 6(*b*) represents an area for defining the categorization rule inputted in the process in step S16. Displayed in FIG. 6(*b*) is a categorization rule defining a purport that the name of product displayed as the fundamental data is classified into one of the categories consisting of the beginner's machine, the intermediate machine and the high grade machine.

The numeral (4) in FIG. 6(*b*) designates a button for advancing the process to a next period. Upon depressing this button, an input screen for similarly defining the categorization rule with respect to the next applicable period.

FIG. 7 is a table showing an example of the category definition dictionary 7. The category definition data about the product line-up are registered in this category definition dictionary 7 and is created by the category definition creating/registering process shown in FIGS. 5 and 6. The categorization rule shown in FIG. 7 is created per applicable period as follows:

| Applicable Period | Category | Fundamental Data (Name of Product) |
|---|---|---|
| First Period (1992/4/1– 1993/3/31) | Beginner's Machine | H0(FMV433) |
| | | H1(FMV450) |
| | Intermediate Machine | G0(FMV450S) |
| | | G1(FMV466) |
| | High grade Machine | F0(FMV466DX) |

Thus, the categorization rule corresponding to the application purpose (which is herein the product line-up) of the database 6 is defined per applicable period and registered in the category definition dictionary 7. Therefore, it is feasible to categorize and tabulate the plurality of records registered in the database 6 in the way to which the categorization rule corresponding to the application purpose and applicable period is applied.

FIG. 8 is a flowchart showing a record categorizing/ tabulating process (a subroutine in step S3 shown in FIG. 3) by the categorizing/tabulating part 5 as well as by the categorization indicating part 4 shown in FIG. 2. Referring to FIG. 8, to begin with, the categorization indicating part 4 indicates the display 8 to display a selected screen of the category definition and the data on the basis of contents of the category definition dictionary 7 and of the database 6 (S21). For instance, the following category and the data (containing the record) are displayed on the selected screen (see FIG. 9).

---

Figure 9:
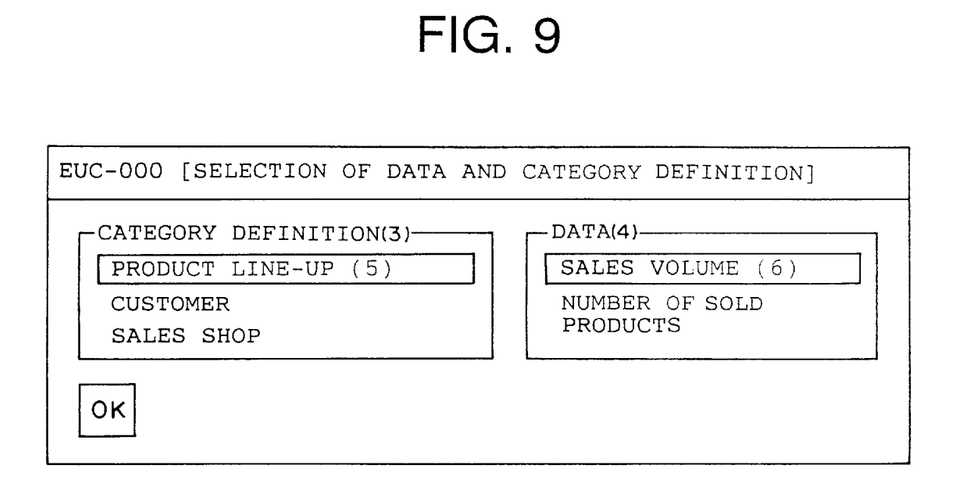
FIG. 9 is a table showing an example of a screen display in the categorizing/tabulating process shown in FIG. 8.

Category:

Merging the sales database 6 and the category definition dictionary 7
Customer
Sales Shop
Product Line-Up
Data:

Sales Volume
Number of Sold Products

---

Next, the categorization indicating part 4 prompts the operator to select the category and the data that correspond to the application purpose of the database 6 (S22). Responding thereto, the operator is able to select a category and a data by use of the input unit 9. Herein, by way of an example, it is assumed that "Product Line-Up" of, e.g., "(5)" is selected from the categories displayed in the category display area of "(3)", and "Sales Volume" of, e.g., "(6)" is selected therefrom on the selected screen shown in FIG. 9.

Thereupon, the categorization indicating part 4 judges whether or not the category selected in step S22 exists in the database 6 (S23). In this case, if the category exists in the database 6 (S23; YES), the categorizing/tabulating part 5 categorizes accoding to a item existing in the database 6 (S24), and categorizes and tabulates the records per customer on the basis of the database 6 (S25). The processes in these steps S24 and S25 are identical with the conventional processes.

Whereas if the category selected in step S22 does not exist in the database 6 (S23; NO), the processing proceeds to step S31, wherein the process according to the present invention is executed. Namely, the categorizing/tabulating process is implemented per applicable period on the basis of the relevant category definition data in processes in steps S31–S38.

More specifically, when the processing proceeds to step S31, the categorizing/tabulating part 5 reads out the category definition data shown in FIG. 7 out of the category definition dictionary 7 as the category definition ta coming under the category (which is herein the product line-up) selected in step S22, and deals with the categorization rule corresponding to the first applicable period as an application target. Subsequently, the categorizing/tabulating part 5 fetches one of the records from the database 6 (S32).

Subsequently, the categorizing/tabulating part 5 judges whether or not "Sales Date" stored in the record fetched in step S32 falls within the applicable period relevant to the processing target (S33). In this case, if "Sales Date" is not within the applicable period (S33; NO), the processing proceeds to step S37. Whereas if "Sales Date" is within the applicable period (S33; YES), the categorizing/tabulating part 5 categorizes the records on the basis of the fundamental data (which is herein the name of product: See FIG. 7) corresponding to the applicable period relevant to the processing target.

Herein, the fundamental data (the name of product) in the record is classified into a relevant category (one of the beginner's machine, the intermediate machine and the high grade machine herein) within the present applicable period (the first period), and the data (sales volume) selected in step S22 out of the record is extracted. Judged thereafter is whether or not the categorizing process of all the relevant records within the database 6 is finished (S35). When judging that the categorizing process comes to an end (S35; YES), the number of records (sales volume) with respect to the respective categories is tabulated (S36), thus finishing the categorizing/tabulating process.

Whereas if the categorizing process is not yet finished (S35; NO), the processing returns to step S32, wherein the next record is fetched out of the database 6. Then, the processes in steps S32–S35 are repeated till a YES judgement is made in step S35.

On the other hand, when the processing proceeds to step S37, a next applicable period in the category definition data becomes a target to be applied. Subsequently, whether or not the applicable period terminates is judged (S38). If the applicable period terminates (S38; YES), the processing goes back to step S32. Whereas if the applicable period does not yet terminate (S38; NO), the processing returns to step S33.

Thus, according to the categorizing/tabulating process, when a NO judgement is made in step S23, the processes in steps S31–S38 are executed. Each of the records fetched from the database 6 is thereby classified into the relevant category (one of the beginner's machine, the intermediate machine and the high grade machine) per relevant applicable period in accordance with the relevant category definition data (see FIG. 7) within the category definition dictionary 7, and then tabulated. Accordingly, it is feasible to categorize and tabulate the relevant products within the database 6 according to the generations (applicable periods).

FIG. 9 is a table showing a display example of the selected screen displayed on the display 8 in the process in step S21. The numeral "(3)" in FIG. 9 represents an area for displaying a name of category in order for the operator to select the category matching with the application purpose of the database 6, and the following category names are herein displayed by way of an example.

Product Line-Up

Customer

Sales Shop

The numeral "(4)" in FIG. 9 indicates an area for displaying the data selected in accordance with the application purpose.

Sales Volume

Number of Sold Products

The operator selects the category and the data through the input unit 9 with reference to the selected screen in FIG. 9. FIG. 9 shows a case in which "Product Line-Up" of "(5)" is selected from the display content in the category display area and "Sales Volume" of "(6)" is selected from the display content in the data display area.

Figure 10:
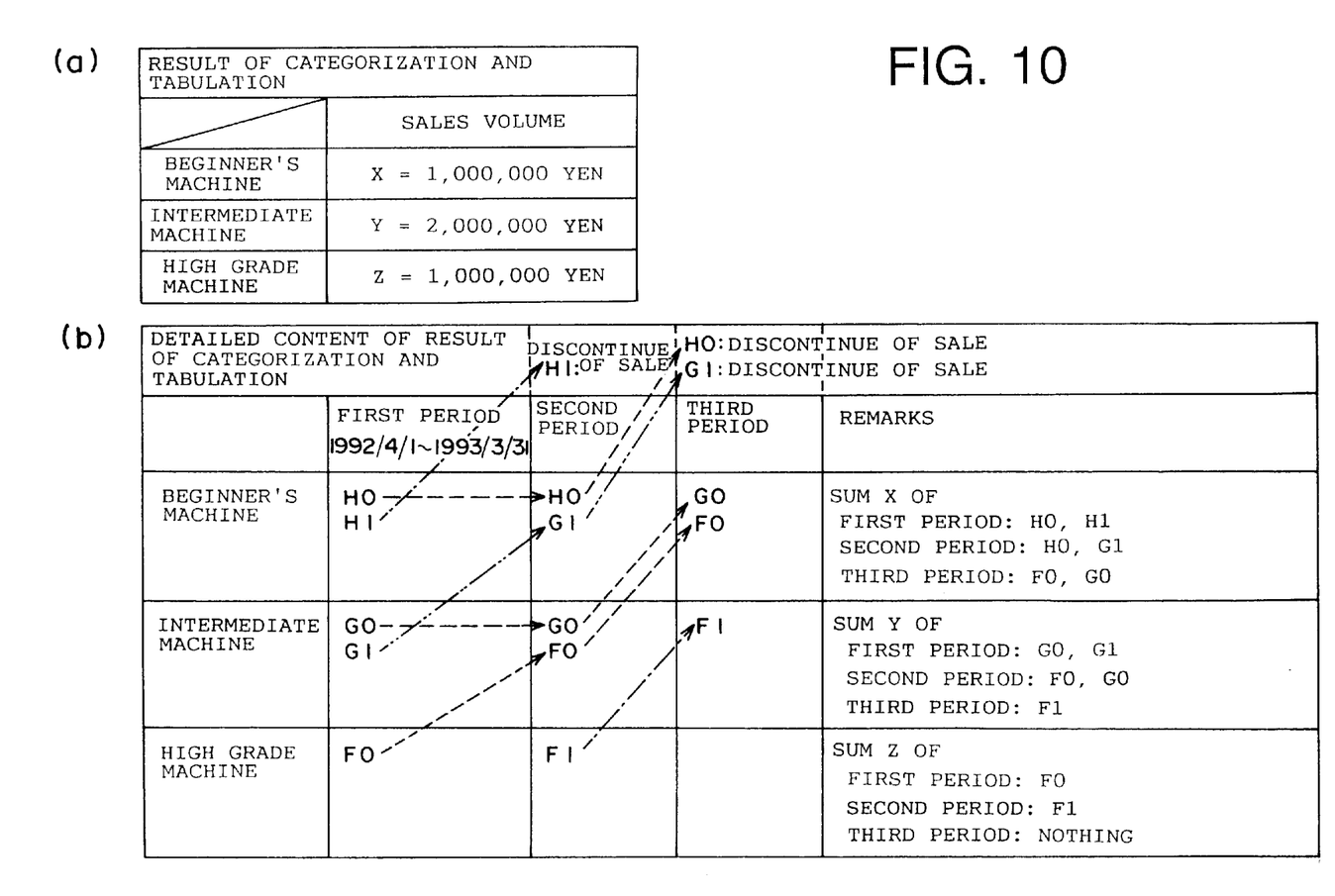
FIG. 10 is an explanatory table showing a result of the categorizing/tabulating process shown in FIG. 8.

FIG. 10(*a*) is a table illustrating an example of the screen display showing a result of the categorizing/tabulating process. Given on this screen is the example of the screen display when "Product Line-Up" and "Sales Volume" are selected from the selected screen shown in FIG. 9 in the process in step S22, and, after finishing the processes in steps S31–S38, the following content is displayed on the display 8.

| Category | Sales Volume |
|---|---|
| Beginner's Machine | X = 1,000,000 yen |
| Intermediate Machine | Y = 2,000,000 yen |
| High grade Machine | Z = 1,000,000 yen |

FIG. 10(*b*) is a table showing an example of a detailed content of the result of the categorizing/tabulating process. Referring to FIG. 10(*b*), the applicable periods (the first, second and third periods) are shown on the axis of abscissa at an upper part of the chart, and the categories (the beginner's machine, the intermediate machine and the high grade machine) are shown on the axis of ordinates at the left edge of the table. The symbols H0, H1, G0, F0 and F1 in FIG. 10(*b*) designate names of products and correspond to the fundamental data (the names of products) shown in FIG. 7. As indicated by arrowheads in FIG. 10(*b*), it can be recognized how the product name F0 transits such as the high grade machine→the intermediate machine→the beginner's machine every time the applicable period transits such as the first period the second period→the third period.

As discussed above, according to the data utilizing system in the present embodiment, the records in the database 6 are categorized and tabulated per applicable period on the basis of the category definition dictionary 7 shown in FIG. 7, and hence there is displayed in understandable way how the product transits per applicable period, i.e., how a treatment of the product transits per generation. Hence, it is possible to provide the user of the database 6 with the data helpful for easily grasping the trends of the commercial goods.

It is apparent that, in this invention, a wide range of different working modes can be formed based on the invention without deviating from the spirit and scope of the invention. This invention is not restricted by its specific working modes except being limited by the appended claims.

What is claimed is:

1. A data utilizing system comprising:
   data holding means for holding plural pieces of data made to correspond to time;
   category definition data holding means for holding plural pieces of category definition data defining a categorization rule about the plural pieces of data, each of said pieces of category definition data related to any one of applicable periods; and
   categorizing means for categorizing, per applicable period, plural pieces of data corresponding to time within the applicable period held by said data holding means, in accordance with category definition data related to said applicable period held by said category definition data holding means.

2. A data utilizing system according to claim 1, further comprising tabulating means for tabulating, per said applicable period, per set of data categorized by said categorizing means, a numerical element of data included said set of data.

3. A data utilizing system according to claim 1, wherein said data holding means holds each of the plural pieces of data as a record consisting of data about a plurality of items, and
   each of said category definition data contains a categorization rule related to said applicable period, about at least one of the items in the record.

4. A data utilizing system according to claim 3, wherein any one of the items in the record is a name of product.

5. A data utilizing method comprising:

a first step of holding plural pieces of data made to correspond to time;

a second step of holding plural pieces of category definition data defining a categorization rule about the plural pieces of data, each of said pieces of category definition data related to any one of applicable periods; and a third step of categorizing, per applicable period, plural pieces of data corresponding to time within the applicable period held by said first step, in accordance with category definition data related to said applicable period held by said second step.

6. A computer readable medium recorded with a computer program comprising:

a first step of holding plural pieces of data made to correspond to time;

a second step of holding plural pieces of category definition data defining a categorization rule about the plural pieces of data, each of said pieces of category definition data related to any one of applicable periods; and a third step of categorizing, per applicable period, plural pieces of data corresponding to time within the applicable period held by said first step, in accordance with category definition data related to said applicable period held by said second step.

* * * * *